O. C. GREEN.
Grain-Drill.
No. 16,540.
Patented Feb. 3, 1857.
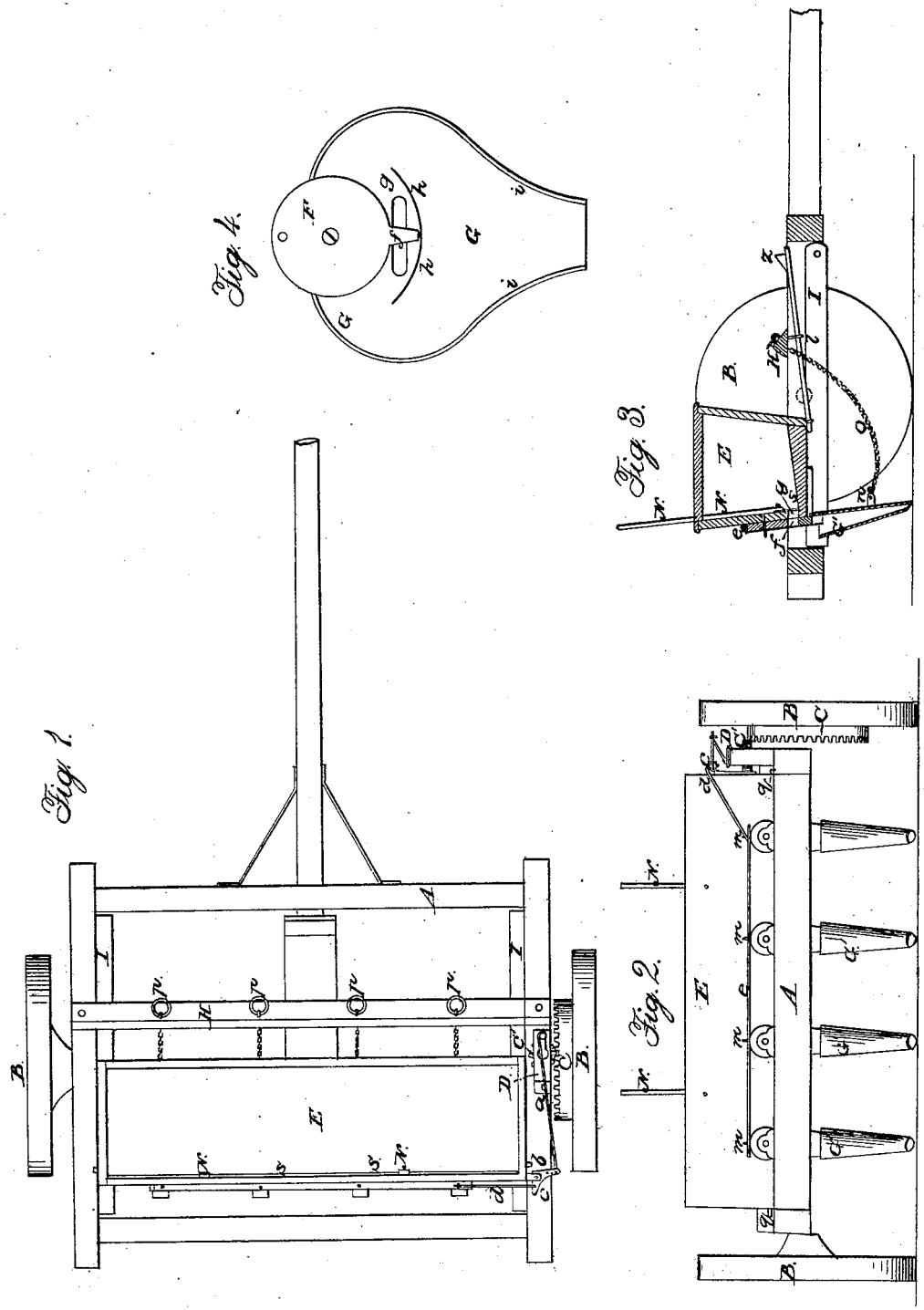

UNITED STATES PATENT OFFICE.

OLIVER C. GREEN, OF WOOSTER, ILLINOIS.

IMPROVEMENT IN SEED-DRILLS.

Specification forming part of Letters Patent No. 16,540, dated February 3, 1857.

*To all whom it may concern:*

Be it known that I, OLIVER C. GREEN, of Wooster, in the county of Scott and State of Illinois, have invented certain new and useful Improvements in Seeding-Machines, of which the following is a full, clear, and exact description, reference being had to the accompanying drawings thereof, in which—

Figure 1 represents a plan of a machine embracing my improvement; Fig. 2, a rear elevation; Fig. 3, a vertical longitudinal section of the same, taken through the line $x\,x$ of Fig. 1; and Fig. 4 an enlarged view of the discharging apparatus with the back plate removed.

My improvement relates, first, to an improved mode of discharging the seed into the distributing-tube as it passes from the hopper, whereby choking is in a great measure prevented and the seed delivered at regular intermittent intervals. As it frequently happens that notwithstanding the tubes may be so made as to be drawn up flush with the cross-beams, there are obstructions in a field of sufficient magnitude to prevent them from overriding them while in that position, I have devised a plan by which the whole seeding apparatus may be considerably raised in order to give the machine greater facilities to surmount them, and which consists in so hinging the hopper and its distributing parts to the main frame that they may be raised and lowered at pleasure, this arrangement having also other advantages of a most important character, as it enables the farmer to regulate the depth at which he may wish to deposit the seed.

To enable others to make, construct, and use my invention, I will now proceed to describe its parts in detail.

In the accompanying drawings, A represents a rectangular frame, supported upon suitable wheels, B, upon one of which is cast or secured a spur-wheel, C, gearing into a pinion, C', the lower end of whose shaft is supported and works in bearings on the frame A, while its upper end works in a bearing formed in a standard, D, of suitable shape, from which motion is communicated to the distributing apparatus by means of a crank secured on the upper end of the shaft of the pinion and a pitman-rod, $a$, secured to one end of a bell-crank, $b$, having its pivot supported in a bracket, $c$, secured to the end of the hopper E, this end of the bell-crank having a series of holes pierced in it for the reception of the pitman-rod $a$, so that a longer or shorter stroke may be communicated to the discharging apparatus, as desired. Upon the short end of the crank $b$ is pierced another hole for the reception of the bent end of another pitman-rod, $d$, whose other end is secured to a slide-bar, $e$, and through which the motion of the bell-crank is communicated to the oscillating disks F, upon each of which is formed an arm, $f$, which, as the grain passes through the aperture $g$ of the hopper E, throws it or pushes it along the concave $h$ until it drops down inclined planes or curved guideways $i$, that lead it into the distributing-tube G', the seed being discharged twice from off the concave $h$ for every revolution of the pinion, or once from either side of the arm, thus giving a regular intermittent feed, these guideways $i$ forming the sides of a chamber, G, that incases the lower part of the armed disks F, and by which the grain is conducted into the tube G'.

To the upper edge of the disks F is secured a bar, $e$, which connects them all together by means of pins $m$, and through which motion is communicated to them from the pitman-rod $d$, the oscillation of the disk by the oscillating motion or the arm formed on its under side causing it to deposit the grain into the distributing-tubes G' at regular intervals, and which at the same time prevents the clogging of the apparatus by dragging the grain out as it strikes it in passing the feeding-aperture $g$ of the hopper E.

Upon the lower side of the hopper E are hinged the distributing-tubes G', upon the front part of each of which is secured a loop, $n$, into which the hook of a chain, $o$, cord, or lever fits, leading forward through a hole or slot in a beam, H, and having a handle or ring, $p$, secured to its end, by which all or any of the tubes may be drawn up flush with the bottom of the hopper in order to be placed out of harm's way in overriding stumps, &c., this peculiar attachment of the tubes being rendered more effective by supporting and securing the hopper and the seeding apparatus to a frame, I, hinged at its forward end to the inner side of the side beams of the main frame A, the rear end being supported upon pins $q$, one on either side, passed through holes in the ends of the hopper, and which rest upon the side beams of the main frame. By withdrawing these pins and placing them either in a higher or lower hole, of which there are a series on either side, the farmer is enabled to regulate the depth at which he wishes to deposit the seed.

To the lower side of the beam H is suspended a lever, L, by means of a hanger, $l$, and which forms its fulcrum, the rear end of which extends under the first part of the hopper. By this lever the driver is enabled to raise and lower the hopper and appendages, as may be required, by depressing its front end with his foot until it strikes the stop $r$, which prevents the hopper from being raised too high.

To the inside of the rear side of the hopper E are pivoted two levers, N, within easy reach of the driver, to the lower ends of which are jointed slides $s$, moving between guides, by operating which the apertures $g$ are increased or lessened, as it is desired to sow thick or thin, the slides in this case being made in two parts, as it is sometimes desirable to use but one-half of the seeding apparatus, as in finishing a field, &c.

Having thus described my invention, what I claim as new, and desire to secure by Letters Patent, is—

The arrangement of the oscillating armed disks F, concave $h$, and guideways $i$, in combination with the aperture $g$ of the hopper, in the manner substantially as set forth.

In testimony whereof I have hereunto subscribed my name, before two witnesses, this 24th day of July, 1856.

OLIVER C. GREEN.

Witnesses:
WILLIAM P. WOOD,
ARTHUR C. WATKINS.